United States Patent
Spence, III

(10) Patent No.: US 7,284,641 B1
(45) Date of Patent: Oct. 23, 2007

(54) WHEEL LOCKING SYSTEM

(76) Inventor: James E. Spence, III, 1824 W. Terrace Ave., Fresno, CA (US) 93705

( * ) Notice: Subject to any disclaimer, the term of this patent is extended or adjusted under 35 U.S.C. 154(b) by 60 days.

(21) Appl. No.: 11/171,025

(22) Filed: Jul. 1, 2005

(51) Int. Cl.
*B60T 3/00* (2006.01)
*B60T 1/14* (2006.01)

(52) U.S. Cl. .......................................... 188/32; 188/4 R

(58) Field of Classification Search ................. 188/2 R, 188/4 R, 5, 31, 32, 36, 68, 69, 262
See application file for complete search history.

(56) References Cited

U.S. PATENT DOCUMENTS

| | | | | |
|---|---|---|---|---|
| 3,547,228 A | * | 12/1970 | Wiley | 188/32 |
| 3,845,844 A | * | 11/1974 | Woerner | 188/32 |
| 4,694,936 A | * | 9/1987 | Jackson | 188/2 R |
| 5,158,158 A | | 10/1992 | Balogh et al. | |
| 5,392,880 A | * | 2/1995 | Christian | 188/32 |
| 5,490,582 A | * | 2/1996 | Trowbridge | 188/2 R |
| 5,547,045 A | | 8/1996 | Stutzman | |
| 5,769,186 A | * | 6/1998 | Roberts | 188/32 |
| 5,884,744 A | | 3/1999 | Slodkowski | |
| 7,036,637 B1 | * | 5/2006 | Wiens | 188/36 |

* cited by examiner

*Primary Examiner*—Devon C. Kramer
*Assistant Examiner*—James K. Hsiao

(57) ABSTRACT

A wheel locking system includes a plate that has an upper edge and a lower edge. A lower housing has a top wall, a bottom wall, a front wall, a back wall, a first lateral side and a second lateral side. The lower edge of the plate extends through the top wall and is fixedly attached to the bottom wall. An upper housing has an upper wall, a lower wall, a forward wall, a rearward wall, a first outer side and a second outer side. The plate extends through the upper and lower walls and the upper housing is selectively positionable on the plate. The forward wall is substantially coplanar with the front wall. The upper and lower housings may be positioned between and abutted against each of a pair of tires to prevent the rotation of the tires.

11 Claims, 4 Drawing Sheets

WHEEL LOCKING SYSTEM

BACKGROUND OF THE INVENTION

1. Field of the Invention

The present invention relates to wheel locking devices and more particularly pertains to a new wheel locking device for removably mounting a pair of adjacent wheels, such as those found a car, to prevent the wheels from rotating.

2. Description of the Prior Art

The use of wheel locking devices is known in the prior art. U.S. Pat. No. 5,392,880 describes a device for abutting against tandem wheels to prevent their rotation. Another type of wheel locking device is U.S. Pat. No. 5,769,186 describes another such device that is abuttable against adjacent wheels and includes both upper and lower abutting members for positioning against the wheels. Still yet another such device is found in U.S. Pat. No. 5,158,158 which includes a lower abutting member that is biased toward an upper abutting member for positioning against a pair of wheels and preventing their rotation.

While these devices fulfill their respective, particular objectives and requirements, the need remains for a device that is positionable against a pair of adjacent wheels and allows for adjustments not only for vertical variations but also allows for lateral variations in a pair of wheels. The device should also be lockable so that a user of the device may prevent unwanted or unauthorized rotation of the wheels.

SUMMARY OF THE INVENTION

The present invention meets the needs presented above by comprising a plate that has an upper edge, a lower edge, a first side edge, a second side edge, a front side and a back side. A lower housing has a top wall, a bottom wall, a front wall, a back wall, a first lateral side and a second lateral side. The plate extends through the top wall and is fixedly attached to the bottom wall. The bottom wall has a length from the first lateral side to the second lateral side that is longer than a length of the top wall. Each of the first and second lateral sides is concavely arcuate from the bottom wall to the top wall. An upper housing has an upper wall, a lower wall, a forward wall, a rearward wall, a first outer side and a second outer side. The plate extends through the upper and lower walls and the upper housing is selectively positionable on the plate. The forward wall is substantially coplanar with the front wall. The lower wall has a length from the first outer side to the second outer side that is less than a length of the upper wall. Each of the first and second outer sides is concavely arcuate from the lower wall to the upper wall. The upper and lower housings may be positioned between and abutted against each of a pair of tires to prevent the rotation of the tires.

The present invention meets the needs presented above by also comprising a lower housing that has a top wall, a bottom wall, a front wall, a back wall, a first lateral side and a second lateral side. The bottom wall has a length from the first lateral side to the second lateral side that is longer than a length of the top wall. Each of the first and second lateral sides is concavely arcuate from the bottom wall to the top wall. An upper housing has an upper wall, a lower wall, a forward wall, a rearward wall, a first outer side and a second outer side. The forward wall is substantially coplanar with the front wall. The lower wall has a length from the first outer side to the second outer side is less than a length of the upper wall. Each of the first and second outer sides is concavely arcuate from the lower wall to the upper wall. The upper and lower housings are attached together so that the bottom wall and the upper wall are orientated parallel to each other. The upper and lower housings may be positioned between and abutted against each of a pair of tires to prevent the rotation of the tires.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
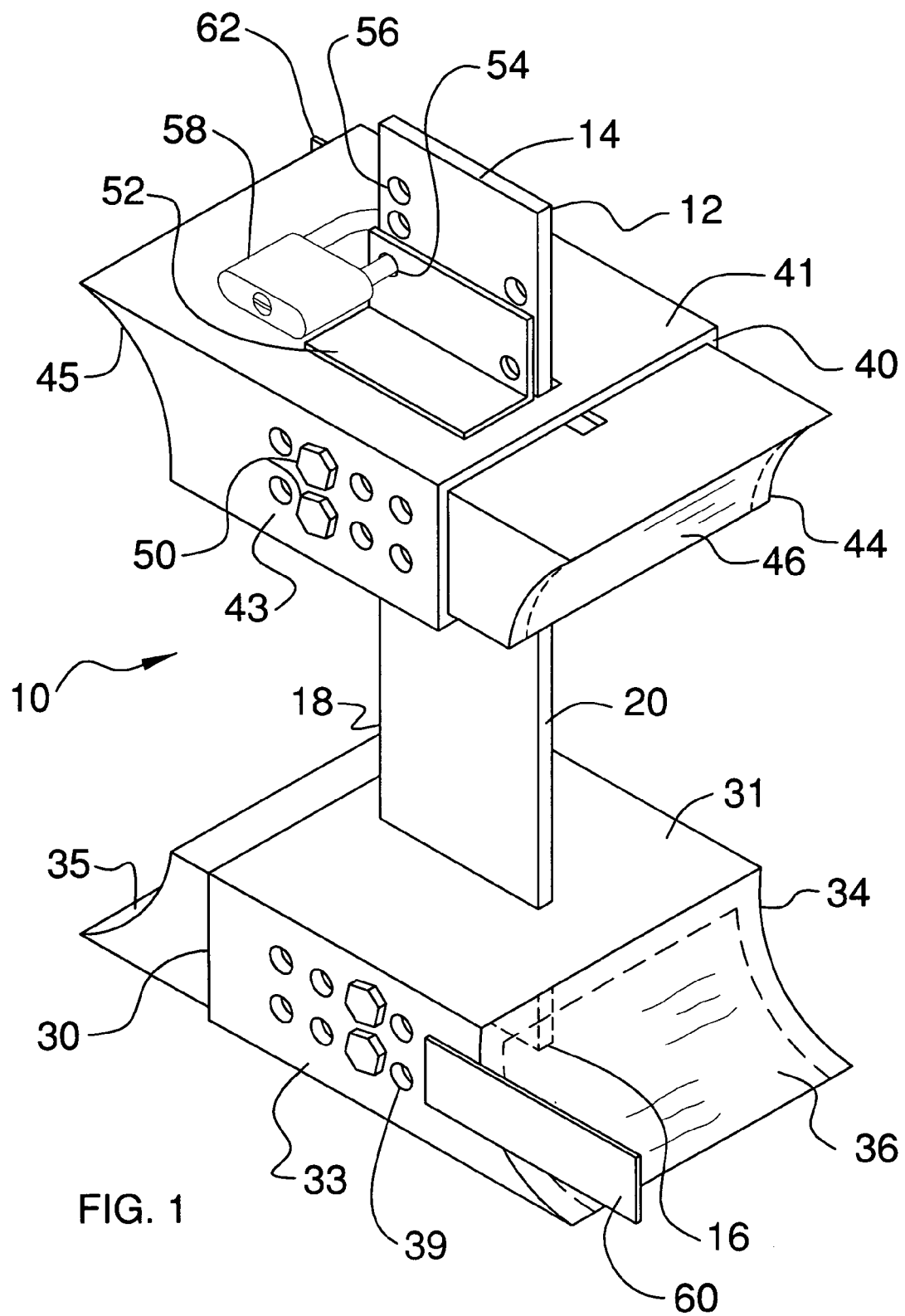
FIG. 1 is a perspective view of a wheel locking system according to the present invention.
Figure 2:
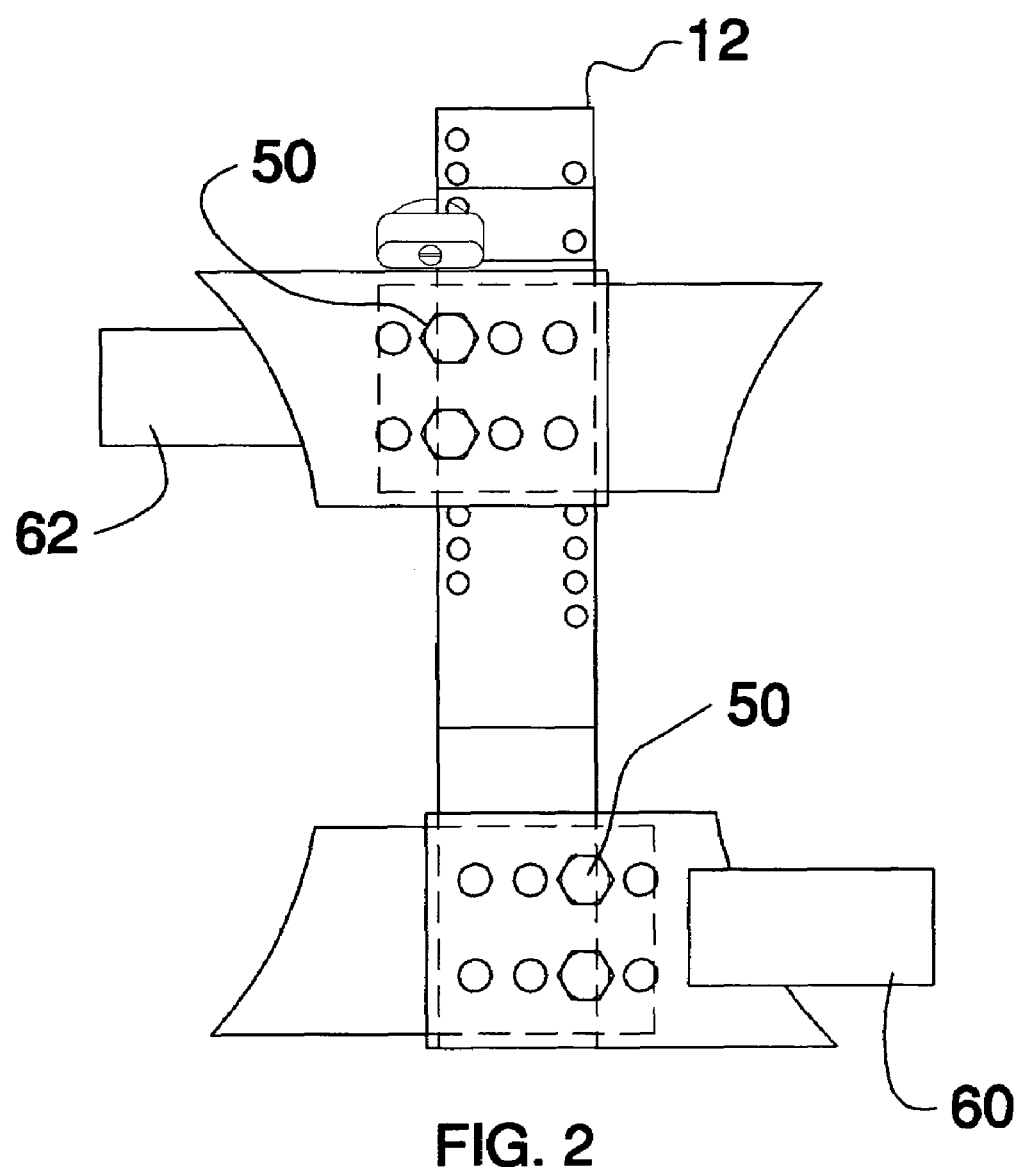
FIG. 2 is a front view of the present invention.
Figure 3:
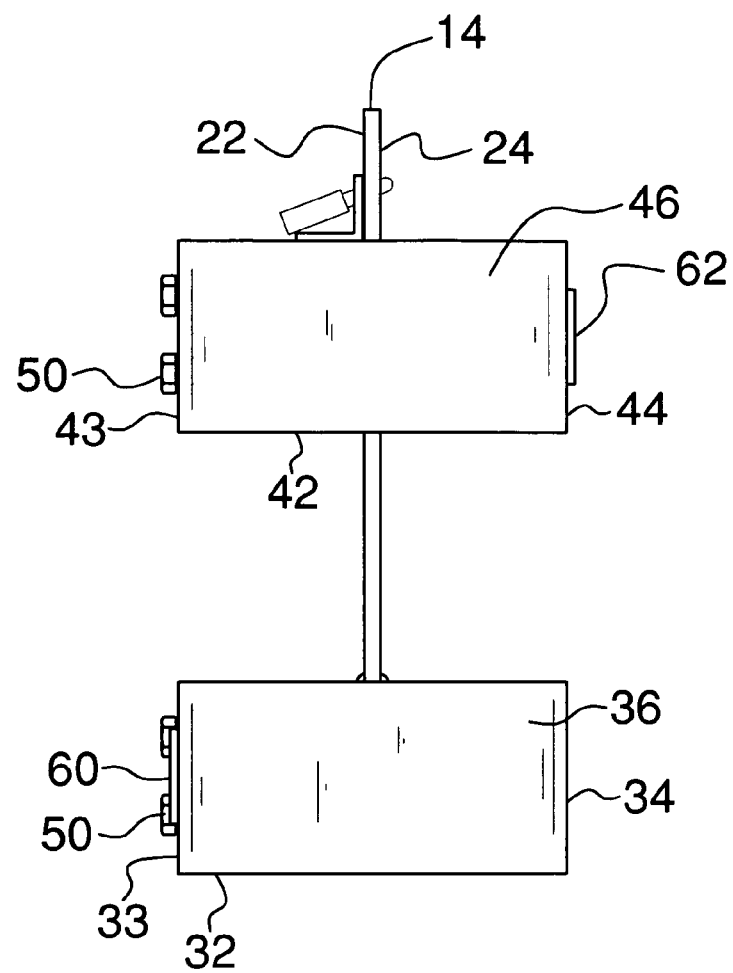
FIG. 3 is a side view of the present invention.
Figure 4:
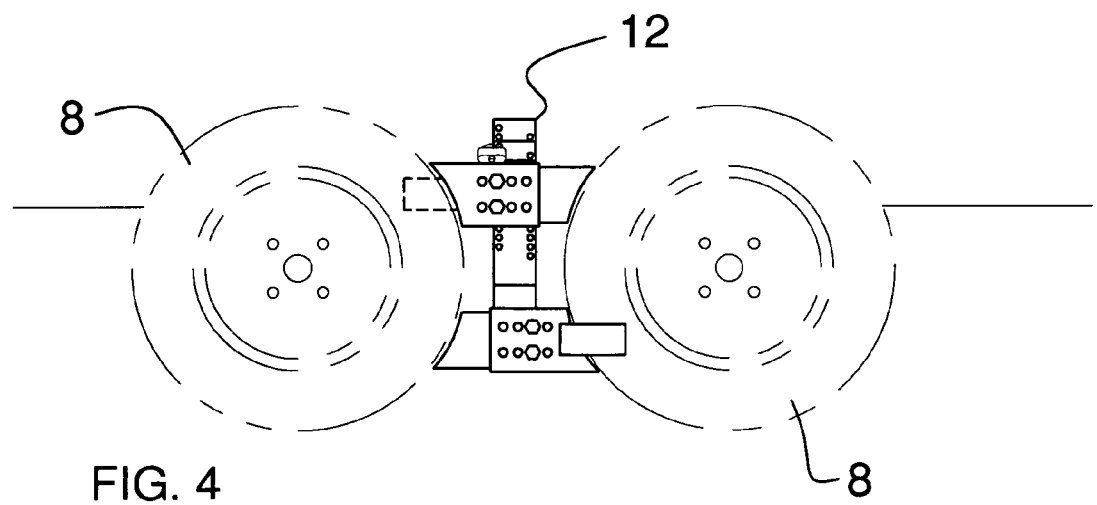
FIG. 4 is a front in-use view of the present invention.
Figure 5:
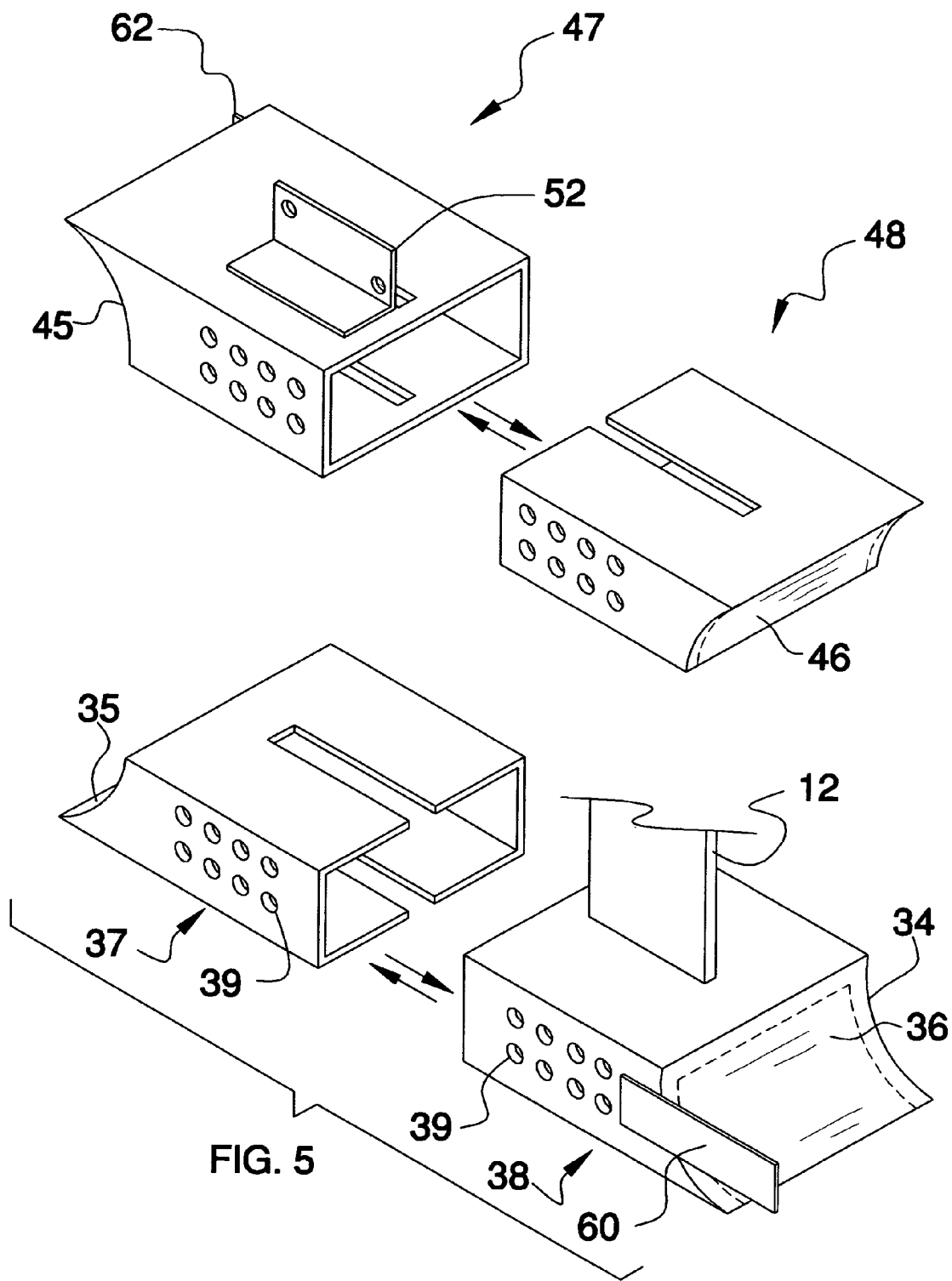
FIG. 5 is an expanded perspective view of the present invention.

With reference now to the drawings, and in particular to FIGS. 1 through 5 thereof, a new wheel locking device embodying the principles and concepts of the present invention and generally designated by the reference numeral 10 will be described.

As best illustrated in FIGS. 1 through 5, the wheel locking system 10 generally comprises a plate 12 that has an upper edge 14, a lower edge 16, a first side edge 18, a second side edge 20, a front side 22 and a back side 24. The plate 12 has a height from the upper edge 14 to the lower edge 16 generally between 9 inches and 15 inches and a width from the first side edge 18 to the second side edge 20 generally between 1½ inches and 4 inches.

A lower housing 30 has a top wall 31, a bottom wall 32, a front wall 33, a back wall 34, a first lateral side 35 and a second lateral side 36. The first 35 and second 36 lateral sides are each preferably coated with a non-slip, or high friction material or texture. The plate 12 extends through the top wall 31 and is fixedly attached to the bottom wall 32. The bottom wall 32 has a length from the first lateral side 35 to the second lateral side 36 that is longer than a length of the top wall 31. Each of the first 35 and second 36 lateral sides is concavely arcuate from the bottom wall 32 to the top wall 31. The lower housing 30 has a break therein so that a first section 37 including the first lateral side 35 and a second section 38 including the second lateral side 36 are defined. The first section 37 is selectively extendable into the second section 38 and a distance between the first 35 and second 36 lateral sides is selectively alterable. Each of the front walls 33 of the first 37 and second 38 sections has a plurality of apertures 39 extending therethrough. Each of the apertures 39 in the first section 37 is alignable with one of the apertures 39 in the second section 38.

An upper housing 40 has an upper wall 41, a lower wall 42, a forward wall 43, a rearward wall 44, a first outer side 45 and a second outer side 46. The first 45 and second 46 outer sides are also each preferably coated with a non-slip, or high friction material or texture. The plate 12 extends through the upper 41 and lower 42 walls and the upper housing 40 is selectively positionable on the plate 12. The forward wall 43 is substantially coplanar with the front wall 33. The lower wall 42 has a length from the first outer side 45 to the second outer side 46 that is less than a length of the upper wall 41. Each of the first 45 and second 46 outer sides is concavely arcuate from the lower wall 42 to the upper wall 41. The upper housing 40 has a break therein so that a first portion 47 including the first outer side 45 and a second portion 48 including the second outer side 46 are defined. The second portion 48 is selectively extendable into the first portion 47 and a distance between the first 45 and second 46 outer sides selectively alterable. Each of the forward walls 43 of the first 47 and second 48 portions has a plurality of apertures 39 extending therethrough. Each of the apertures 39 in the first portion 47 is alignable with one of the apertures 39 in the second portion 48.

A plurality of fasteners 50 is provided. Each of the fasteners 50 is extended through aligned ones of the apertures 39 and releasably secures the first section 37 to the second section 38 and the first portion 47 to the second portion 48.

A bracket 52 is attached to the upper housing 40. The bracket 52 has a plurality of openings 54 extending therethrough. The plate 12 has a plurality of holes 56 extending therethrough. Each of the openings 54 is selectively alignable with one of the holes 56. A locking member 58 is removably attached to and extended through aligned ones of the holes 56 and openings 54. The locking member 58 may comprise a conventional padlock.

A first panel 60 is attached to the front wall 33 of the lower housing 30. The first panel 60 extends away from the second lateral side of the lower housing 30 and positioned in a plane that is orientated parallel to a plane of the front wall 33. A second panel 62 is attached to the rearward wall 44 of the upper housing 40. The second panel 62 extends away from first outer side 45 of the upper housing 40 and positioned in a plane that is orientated parallel to a plane of the rearward wall 44. The first 60 and second 62 panels extend outwardly in opposite directions with respect to each other.

In use, the first 37 and second 38 sections and first 47 and second 48 portions are adjusted to a proper distance from each other so that the outer sides 45, 46 of the upper housing 40 may rest on an upper portion of a pair of adjacent wheels 8 and the lateral sides 35, 36 of the lower portion 30 is abuttable against a lower portion of the tires 8. The fasteners 50 are then used to secure the corresponding sections 37,38 and portions 47,48 together. The upper 40 and lower 30 housings are positioned between the pair of wheels 8, or tires, and the first 45 and second 46 outer sides and the first 35 and second 36 lateral sides are abutted against the wheels 8 to prevent rotation of the wheels by sliding the upper housing 40 down the plate 12 and toward the lower housing 30. The first panel 60 is placed adjacent to an outer surface of the wheels 8 and the second panel 62 is placed adjacent to an inner surface of the wheels to prevent the upper 40 and lower 30 housings from sliding laterally off of the wheels 8. The bracket 52 is then secured to the plate 12 so that a distance between the upper 40 and lower 30 housings is fixed. The upper 40 and lower 30 housings prevent rotations of the wheels 8, particularly those of a trailer and will damage the wheels 8 if someone attempts to rotate the wheels 8.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheel lock assembly for extending between a pair of adjacent wheels, said assembly comprising:

a plate having an upper edge and a lower edge;

a lower housing having a top wall, a bottom wall, a front wall, a back wall, a first lateral side and a second lateral side, said lower edge of said plate extending through said top wall and being fixedly attached to said bottom wall, said bottom wall having a length from said first lateral side to said second lateral side being longer than a length of said top wall, each of said first and second lateral sides being concavely arcuate from said bottom wall to said top wall;

an upper housing having an upper wall, a lower wall, a forward wall, a rearward wall, a first lateral side and a second lateral side, said plate extending through said upper and lower walls and said upper housing being selectively positionable on said plate, said forward wall being substantially coplanar with said front wall, said lower wall having a length from said first outer side to said second outer side being less than a length of said upper wall, each of said first and second outer sides being concavely arcuate from said lower wall to said upper wall, said lower housing having a break therein so that a first section including said first lateral side and a second section including said second lateral side are defined, said first section being selectively extendable into said second section and a distance between said first and second lateral sides selectively alterable, said upper housing having a break therein such that a first portion including said first outer side and a second portion including said second outer side are defined, said second portion being selectively extendable into said first portion and a distance between said first and second outer sides selectively alterable;

wherein said upper and lower housings may be positioned between and abutted against each of a pair of tires;

a first panel being attached to said front wall of said lower housing, said first panel extending away from said lower housing and positioned in a plane orientated parallel to a plane of said front wall;

a second panel being attached to said rearward wall of said upper housing, said second panel extending away from said upper housing and positioned in a plane orientated parallel to a plane of said rearward wall, said first and second panels extending outwardly in opposite directions with respect to each other; and said first and second panels defining abutting members being positionable on opposite faces of the adjacent wheels, said back wall of said lower housing and said forward wall of said upper housing each lacking an abutting member.

2. The assembly according to claim 1, wherein said plate has a height from said upper edge to said lower edge generally between 9 inches and 15 inches, said plate having a width from said first side edge to said second side edge generally between 1½ inches and 3 inches.

3. The assembly according to claim 1, wherein each of said front walls of said first and second sections has a plurality of apertures extending therethrough, each of said apertures in said first section being alignable with one of said apertures in said second section, each of said forward walls of said first and second portions having a plurality of apertures extending therethrough, each of said apertures in said first portion being alignable with one of said apertures in said second portion.

4. The assembly according to claim 3, further including:
a bracket being attached to said upper housing, said bracket having a plurality of openings extending therethrough, said plate having a plurality of holes extending therethrough, each of said openings being selectively alignable with one of said holes; and
a locking member being removably attached to and extended through aligned ones of said holes and openings.

5. The assembly according to claim 1, further including a plurality of fasteners, each of said fasteners being extended through aligned ones of said apertures and releasably securing said first section to said second section and said first portion to said second portion.

6. The assembly according to claim 1, further including:
a bracket being attached to said upper housing, said bracket having a plurality of openings extending therethrough, said plate having a plurality of holes extending therethrough, each of said openings being selectively alignable with one of said holes; and
a locking member being removably attached to and extended through aligned ones of said holes and openings.

7. A wheel lock assembly for extending between a pair of adjacent wheels, said assembly comprising:
a lower housing having a top wall, a bottom wall, a front wall, a back wall, a first lateral side and a second lateral side, said bottom wall having a length from said first lateral side to said second lateral side being longer than a length of said top wall, each of said first and second lateral sides being concavely arcuate from said bottom wall to said top wall;
an upper housing having an upper wall, a lower wall, a forward wall, a rearward wall, a first lateral side and a second lateral side, said forward wall being substantially coplanar with said front wall, said lower wall having a length from said first outer side to said second outer side being less than a length of said upper wall, each of said first and second outer sides being concavely arcuate from said lower wall to said upper wall, said upper and lower housings being attached together such that said bottom wall and said upper wall are orientated parallel to each other, said lower housing having a break therein so that a first section including said first lateral side and a second section including said second lateral side are defined, said first section being selectively extendable into said second section and a distance between said first and second lateral sides selectively alterable, said upper housing having a break therein such that a first portion including said first outer side and a second portion including said second outer side are defined, said second portion being selectively extendable into said first portion and a distance between said first and second outer sides selectively alterable;
wherein said upper and lower housings may be positioned between and abutted against each of a pair of tires;
a first panel being attached to said front wall of said lower housing, said first panel extending away from said lower housing and positioned in a plane orientated parallel to a plane of said front wall;
a second panel being attached to said rearward wall of said upper housing, said second panel extending away from said upper housing and positioned in a plane orientated parallel to a plane of said rearward wall, said first and second panels extending outwardly in opposite directions with respect to each other; and
said first and second panels defining abutting members being positionable on opposite faces of the adjacent wheels, said back wall of said lower housing and said forward wall of said upper housing each lacking an abutting member.

8. The assembly according to claim 7, further including a plate being attached to and extending between said lower and upper housings.

9. The assembly according to claim 7, wherein each of said front walls of said first and second sections has a plurality of apertures extending therethrough, each of said apertures in said first section being alignable with one of said apertures in said second section, each of said forward walls of said first and second portions having a plurality of apertures extending therethrough, each of said apertures in said first portion being alignable with one of said apertures in said second portion.

10. The assembly according to claim 9, further including a plurality of fasteners, each of said fasteners being extended through aligned ones of said apertures and releasably securing said first section to said second section and said first portion to said second portion.

11. A wheel lock assembly for extending between a pair of adjacent wheels, said assembly comprising:
a plate having an upper edge, a lower edge, a first side edge, a second side edge, a front side and a back side, said plate having a height from said upper edge to said lower edge generally between 9 inches and 15 inches, said plate having a width from said first side edge to said second side edge generally between 1½ inches and 3 inches;
a lower housing having a top wall, a bottom wall, a front wall, a back wall, a first lateral side and a second lateral side, said first and second lateral sides each having a high friction outer surface, said lower edge of said plate extending through said top wall and being fixedly attached to said bottom wall, said bottom wall having a length from said first lateral side to said second lateral side being longer than a length of said top wall, each of said first and second lateral sides being concavely arcuate from said bottom wall to said top wall, said lower housing having a break therein such that a first section including said first lateral side and a second section including said second lateral side are defined, said first section being selectively extendable into said second section and a distance between said first and second lateral sides selectively alterable, each of said front walls of said first and second sections having a plurality of apertures extending therethrough, each of said apertures in said first section being alignable with one of said apertures in said second section;

an upper housing having an upper wall, a lower wall, a forward wall, a rearward wall, a first outer side and a second outer side, each of said first and second outer sides having a high friction outer surface, said plate extending through said upper and lower walls and said upper housing being selectively positionable on said plate, said forward wall being substantially coplanar with said front wall, said lower wall having a length from said first outer side to said second outer side being less than a length of said upper wall, each of said first and second outer sides being concavely arcuate from said lower wall to said upper wall, said upper housing having a break therein such that a first portion including said first outer side and a second portion including said second outer side are defined, said second portion being selectively extendable into said first portion and a distance between said first and second outer sides selectively alterable, each of said forward walls of said first and second portions having a plurality of apertures extending therethrough, each of said apertures in said first portion being alienable with one of said apertures in said second portion a plurality of fasteners, each of said fasteners being extended through aligned ones of said apertures and releasably securing said first section to said second section and said first portion to said second portion;

a bracket being attached to said upper housing, said bracket having a plurality of openings extending therethrough, said plate having a plurality of holes extending therethrough, each of said openings being selectively alignable with one of said holes;

a locking member being removably attached to and extended through aligned ones of said holes and openings;

a first panel being attached to said front wall of said lower housing, said first panel extending away from said lower housing and positioned in a plane orientated parallel to a plane of said front wall;

a second panel being attached to said rearward wall of said upper housing, said second panel extending away from said upper housing and positioned in a plane orientated parallel to a plane of said rearward wall, said first and second panels extending outwardly in opposite directions with respect to each other; and wherein said upper and lower housings may be positioned between a pair of tires and said first and second outer sides and said first and second lateral sides abutted against the wheels to prevent rotation of the wheels.

* * * * *